(12) United States Patent
Andre

(10) Patent No.: US 7,108,296 B2
(45) Date of Patent: Sep. 19, 2006

(54) FLUID QUICK CONNECTOR FOR THREADED FLUID COMPONENTS

(75) Inventor: Michael J. Andre, Waterford, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/245,066

(22) Filed: Sep. 17, 2002

(65) Prior Publication Data

US 2004/0051314 A1    Mar. 18, 2004

(51) Int. Cl.
*F16L 39/00* (2006.01)

(52) U.S. Cl. .................. 285/319; 285/390; 285/133.4; 29/282; 29/890.14

(58) Field of Classification Search ............. 285/390, 285/391, 319, 386, 384, 387, 388, 133.4, 285/133.11; 29/890.14
See application file for complete search history.

(56) References Cited

U.S. PATENT DOCUMENTS

| | | | |
|---|---|---|---|
| 175,562 A * | 4/1876 | Hovey | 285/390 |
| 963,248 A * | 7/1910 | Ramelli | 285/133.4 |
| 3,224,800 A * | 12/1965 | Fisher | 285/319 |
| 3,390,898 A | 7/1968 | Sumida | |
| 3,394,950 A | 7/1968 | Jensen | |
| 3,603,621 A * | 9/1971 | Parsons | 285/319 |
| 4,066,282 A * | 1/1978 | Vann | 285/319 |
| 4,265,470 A * | 5/1981 | Danner | 285/319 |
| 4,373,753 A * | 2/1983 | Ayers et al. | 285/319 |
| 4,441,745 A | 4/1984 | Nicholas | |
| 4,749,217 A * | 6/1988 | Causby et al. | 285/319 |
| 4,946,204 A | 8/1990 | Boticki | |
| 4,979,765 A | 12/1990 | Bartholomew | |
| 5,042,844 A * | 8/1991 | Iida et al. | 285/319 |
| 5,356,181 A * | 10/1994 | Shirogane et al. | 285/319 |
| 6,257,626 B1 * | 7/2001 | Campau | 285/319 |
| 6,386,596 B1 | 5/2002 | Olson | |

FOREIGN PATENT DOCUMENTS

GB         1 494 984        12/1977

\* cited by examiner

*Primary Examiner*—David Bochna
(74) *Attorney, Agent, or Firm*—Young & Basile, P.C.

(57) ABSTRACT

A fluid quick connector is mountable onto the threads of a threaded fluid component in a sealed fluid connection. A retainer element carried by the fluid quick connector is engagable with the threads on the second fluid component. In one aspect, the retainer element is at least one tab projecting inward into a bore in the quick connector body for engagement with the threads on the fluid component. In another aspect, the retainer is a resilient member carried within an expanded chamber in the quick connector body which has resilient legs positioning a tip end into engagement with the threads on the fluid component.

7 Claims, 3 Drawing Sheets

US 7,108,296 B2

FLUID QUICK CONNECTOR FOR THREADED FLUID COMPONENTS

BACKGROUND

Modern plumbing connections frequently make use of threaded connections between joinable components to sealingly interconnect the components. Compression fittings are a typical threaded plumbing connection found in widespread use for home and building water connections.

While such threaded plumbing connections provide an effective seal between two joinable components, a certain amount of time is necessary to thread the connection together to sealingly join the two components. The same connection must be unthreaded if it is ever necessary to separate the two components.

Fluid quick connectors are employed in other applications, such as vehicle fuel and air lines, to provide rapid assembly of multiple fluid conduits to each other and/or to fluid use devices, such as pumps, air cylinders, valves, brake cylinders, etc. Such fluid quick connectors make use of a housing which receive an endform on another component in a through bore extending through the housing. A retainer is insertable into the housing, either axially from an open first end of the through bore in the housing or transversely in the case of a radially displacable retainer through a transverse bore formed in the housing which intersects the through bore. Such fluid quick connectors have proven an efficient means to provide rapid assembly of fluid components with a high pull-out retention force and without the need for special tools or time consuming threading operation.

Thus, it would be desirable to provide a threaded fluid connection with a quick connect capability. It would also be desirable to provide a threaded fluid connection with a quick connect capability which does not require any modification to the threaded fluid component.

SUMMARY

The present invention is a fluid quick connector mountable on a threaded fluid component.

In one aspect, the quick connector includes is adapted for connecting a first fluid component to a second fluid component, the second fluid component having external threads surrounding a fluid flow port. The quick connector includes a housing have a through bore extending between first and second ends, the first end adapted for connection to the first fluid component. The second end of the housing has a bore portion adapted to be mounted over threads on a fluid port of the second fluid component. A retainer element carried in the housing and engagable with the threads on the second fluid component to connect the housing and the first fluid component to the second fluid component.

In one aspect, the retainer is separate from the housing. In this aspect, the retainer includes a one piece body having an end portion defining an aperture and at least one resilient outer leg projecting from the end portion and terminating in a tip at the end of an inner leg extending angularly inward from an opposite end of the outer leg. The tip end of the inner leg is adapted for engagement with the threads on the second fluid component. In this aspect, the housing has an end portion opening to an expanded internal cavity carrying the retainer. At least one aperture is formed in the end portion of the housing opening to the through bore in the retainer in the housing to allow access to the retainer for separation of the quick connect from the fluid component.

In another aspect, the retainer includes at least one and preferably a plurality of spaced tabs projecting radially inward from an inner surface of the housing into the bore in the housing and adapted to threadingly engage the threads on the fluid component.

The fluid quick connector of the present invention is uniquely usable with existing or conventional threaded plumbing components using a threaded or compression fitting to effect a joint between two fluid components, such as a valve and a tube, etc. The fluid quick connector of the present invention is mountable on the threads of the fluid component for easy and quick connection of another fluid component, such as a tube, to the threaded fluid component as well as providing this capability without requiring any modification to the threaded fluid component.

BRIEF DESCRIPTION OF THE DRAWING

The various features, advantages and other uses of the present invention will become more apparent by referring to the following detailed description and drawing in which.

DETAILED DESCRIPTION

Before describing the inventive quick connector, for purposes of clarity it will be understood that the following description of the use of the fluid quick connector of the present invention with a fluid component will be understood to encompass any type of threaded fluid component which has a threaded port or an externally threaded end providing a threaded connection to another fluid component. For example, the fluid component usable with the fluid quick connector of the present invention can be any fluid component including valves, such as a stop valve shown by example only in the following drawing, fluid use devices, such as faucets, pumps, as well as fluid conduits themselves.

Figure 1:
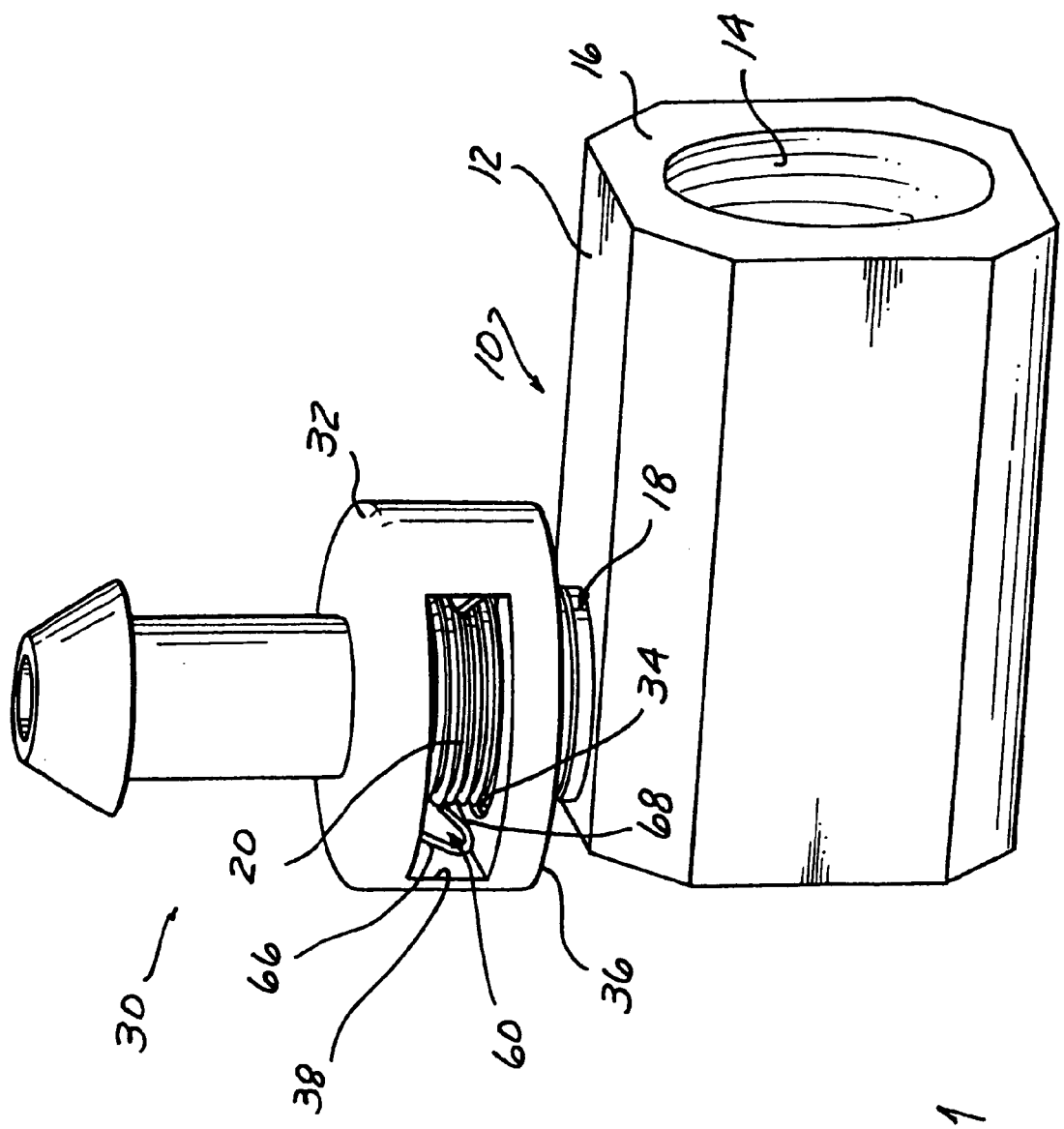
FIG. 1 is a perspective view of a first aspect of a fluid quick connector for a threaded fluid component according to the present invention.

Thus, by example only, as shown in FIG. 1, a fluid component 10 is depicted. The fluid component 10 is illustrated as being in the form of a stop valve having a body 12 with a through bore 14 extending from a first end 16. The bore 14 extends through the interior of body 12 to a port 18 which has externally disposed threads 20 extending along the port 18 to an outer or distal end 22.

A valve operator, not shown, may be mounted on the body 12 at a location opposite from the first end 16 to control the flow of fluid, such as water, between the port 18 and the bore 14 in a known manner.

Figure 2:
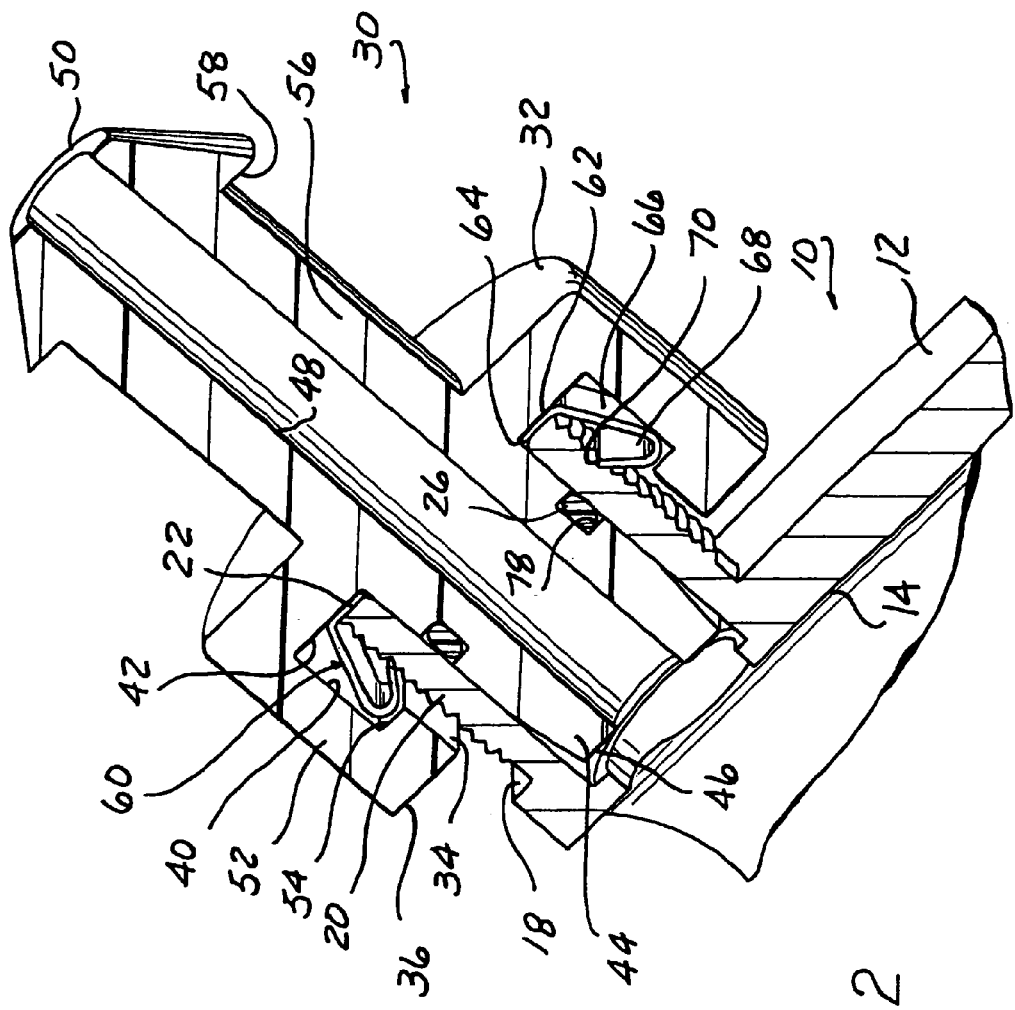
FIG. 2 is a cross-sectional view taken through the center line of the connected fluid quick connector and fluid component shown in FIG. 1.

According to one aspect of the present invention, a fluid quick connector 30 is mountable by on the external threads 20 of the port 18 of the fluid component or stop valve 10. As shown in FIGS. 1 and 2, the fluid quick connector 30 includes a generally one piece body formed of metal or a suitable plastic, such as nylon, filled nylon, polyketone, etc.

The fluid quick connector 30 includes an enlarged body 32 having a bore 34 extending axially inward from a first end 36. An aperture or bore 38 is also formed in the body 32 transversely to and intersecting the bore 34 as shown in FIGS. 1 and 2. The bore 38 preferably extends completely through the body 32 so as to define open portions on opposite sides of the bore 34.

The aperture or bore 38 defines an opening to the interior of the body 34 to provide access for a release tool, not shown, used to disengage a retainer, described hereafter, from the threads 20 to enable disengagement of the quick connector 30 from the fluid component 10, as also described in greater detail hereafter.

As shown in FIG. 2, the bore 34 preferably expands to a larger diameter inner portion 40 before terminating in an inner wall 42.

The bore 34 is preferably annular and concentric about an inner stem portion 44 extending from a first end 46 through the inner wall 42. A fluid through bore 48 extends from the first end 46 of the stem 44 preferably to an opposite or second end 50 of the fluid quick connector 30. The bore 34 in cooperation with the stem 44 and an outer wall portion 52 of the body 32 define an interior chamber with an inward extending lip or flange 54 adjacent the first end 36 of the body 32 which is adapted to receive a retaining means or retainer 60.

The remainder of the fluid quick connector 30 includes an outer stem portion 56 through which an end portion of the fluid bore 68 extends to the second or distal end 50 of the fluid quick connector body 32. At least one or more radially extending projections in the form of barbs 58 may be formed adjacent the distal end 50 of the outer stem 56 to act as a retention means to fixedly and sealingly mount a fluid flexible conduit, not shown, on the outer stem 58 in fluid communication with the fluid bore 48 in the body 32 of the fluid quick connector 30 and the bore 14 in the fluid component 10.

A radially outward opening, annular groove 78 is formed on the stem 44 intermediate the ends 46 and 50. A seal member 76, such as an O-ring, is mounted in the groove 78 to seal the port 18 to the stem 44.

The retainer 60 is preferably in the form of a one piece member of spring steel or other metal having an annular end 62 surrounding an end aperture 64. An outer leg 66 extends angularly from the outer circumference of the annular end portion 60 and terminates in a radially and angularly inward directed leg 68 which terminates in a tip 70.

As shown in FIG. 2, installation of the fluid quick connector 30 on the fluid component 10 is begun by pre-mounting the retainer 60 in the interior chamber in the body 32 of the fluid quick connector 30. The angular opposed outer and inner legs 68 and 66 of the retainer 60, are urged radially inward toward each other to enable the outer diametrical ends at the transition of the outer leg 66 to the inner leg 68 of each leg pair to slide through the open end of the bore 34 until the retainer 60 is inserted sufficiently through the bore 34 to enable the legs 66 and 68 to expand radially outward into the interior chamber formed in the expanded portion 40 of the bore 34. The transition between the outer leg 66 to the inner leg 68 of each leg pair will then expand and engage the juncture between the outer wall 52 and the lip 54 of the body 32 to seat the retainer 60 within the expanded portion 40 of the body 32 as well as to center the aperture 64 on the end 62 of the retainer 60 concentrically about the longitudinal axis of the through bore 48 through the fluid quick connector 30.

The fluid quick connector 30 is then inserted over the distal end 22 of the port 18 of the fluid component 10. Due to the larger diameter of the open end 34 of the bore 30 as compared to the smaller outer diameter of the threads 20 on the port 18. During such insertion, the tip 70 on each leg pair of the retainer will engage the threads 20. Due to the resilient nature of the angularly disposed outer leg 66 and inner leg 68 of each retainer leg pair, the tip 70 on each leg pair will ride radially inward and outward along the threads 20 until the body 32 is inserted sufficiently over the length of the port 18 to bring the inner wall 42 of the body 32 in engagement against the end portion 62 of the retainer and the distal end 22 of the port 18. In this position, the tip end 70 of each retainer leg pair will fixedly and securely engage one of the threads 20 on the port 18 locking the fluid quick connector 30 onto the port 18 and preventing axial separation of the connector 30 from the port 18.

Disengagement of the fluid quick connector 30 from the fluid component 10 may be effected by a release tool, such as a pair of screwdrivers or pointed end pliers which are urged through one of the ends of the transverse bore 38 in the body 32 to radially urge the tips 70 of the each retainer leg pair outward and away from engagement with the threads 20. At the same time, the body 32 is urged axially over the port 18 until it is fully separated from the port 18.

Figure 3:
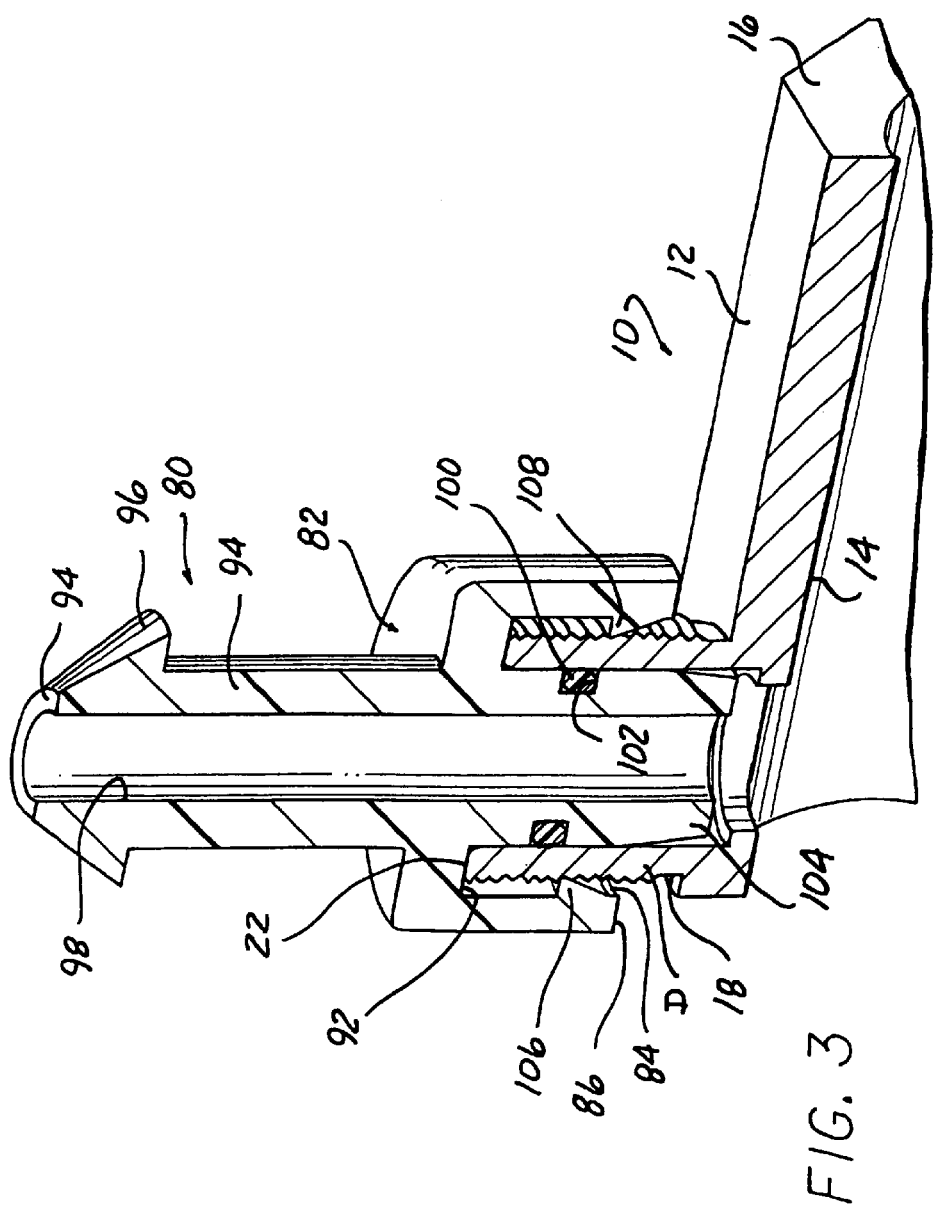
FIG. 3 is a cross-sectional view, similar to FIG. 2, but showing another aspect of the fluid quick connector of the present invention.

Another aspect of a fluid quick connector 80 according to the present invention is shown in FIG. 3. In this aspect, the fluid quick connector 80 is substantially similar to the fluid quick connector 30 in that it includes a body 82 having a bore 84 extending from a first end 86. The bore 84 extends from a first end 86 to an inner wall 92. An outer stem 94 extends from the body 82 to a distal end 94. One or more radially extending barbs or projections 96 are formed adjacent the end 94 for securely receiving a flexible conduit thereover. A fluid bore 98 extends completely through the fluid quick connector 30 from the first end 84 to the distal end 94. At least one seal, such as an O-ring seal 100, is mounted in an annular, recessed groove 102 formed in an inner stem 104 extending from one end of the body 82. The inner stem 104 is disposed concentrically within the bore 84.

In this aspect of the fluid quick connector 80 of the present invention, the retaining means is provided by at least one and preferably a plurality of radially inward extending projections, with two projections 106 and 108 being depicted by way of example only. In place of two or more circumferentially spaced, radially inward extending projection 106 and 108, the retainer means function can be provided by a single angularly inward extending annular projection extending circumferentially continuously or discontinuously within the bore 84.

The inner diameter of the one or more projections 104 and 106 is sized to engage the inner diameter of the threads 84. This enables the fluid quick connector 80 to be threaded onto or off of the threads 20 on the port 18 of the fluid component 10 to mount or separate the fluid quick connector 80 from the fluid component 10. The seal 100 is integrally carried on the inner stem 104 to sealingly engage the bore extending through the port 18 whenever the fluid quick connector 80 is threaded onto the port 18.

In conclusion, there has been disclosed a unique fluid quick connector which is mountable on a threaded fluid component without the need for tools to sealingly mount the quick connector on the fluid component. The inventive quick connect simplifies the sealed attachment of fluid components to each other.

What is claimed is:

1. A method for joining a first fluid component to a second fluid component, the method comprising the steps of:
   providing a first component with a bore extending between first and second ends;
   providing a port on the first component in fluid communication with the bore between the first and second ends;

forming external threads on the port;

providing a housing having a through bore;

mounting the second fluid component to one end of the housing;

disposing an opposite end of the housing over a threaded port of the first fluid component;

capturing a retainer in the housing to fixedly engage threads on the port to lock the port to the housing in a snap fit connection; and forming the retainer with an end portion defining an aperture and at least one resilient outer leg projecting from the end portion and terminating in a tip at an end of an inner leg extending angularly inward from an opposite end of the outer leg, the tip of the inner leg engageable with the threads on the first fluid component.

2. A quick connector for joining a first fluid component having an externally threaded port to a second fluid component manufactured according to the method of claim 1.

3. The method of claim 1 further comprising the step of:

snap connecting the leg of the retainer in the housing with the threads on the port to lock the housing to the port.

4. A fluid quick connector adapted for connecting a first fluid component to a second fluid component, the first fluid component having external threads surrounding a fluid flow port, the quick connector comprising:

a housing having a through bore extending between first and second ends, the first end adapted for connection to a second fluid component;

the second end of the housing having a bore portion adapted to be mounted over threads on the fluid port of the first fluid component; and a retainer carried in the housing and having a movable leg engagable with the threads on the first fluid component as the housing is engaged with the first fluid component to connect the housing to the first fluid component, the retainer including a one piece body having an end portion defining an aperture and at least one resilient outer leg projecting from the end portion and terminating in a tip at an end of an inner leg extending angularly inward from an opposite end of the outer leg, the tip end of the inner leg adapted for engagement with the threads on the first fluid component.

5. The fluid quick connector of claim 4 further comprising:

At least one aperture formed in the second end of the housing opening to an internal cavity in the housing to provide access to the retainer.

6. A method for joining a first fluid component to a second fluid component, the method comprising the steps of:

providing a housing having a through bore;

mounting the second fluid component to one end of the housing;

disposing an opposite end of the housing over a threaded port of the first fluid component;

disposing a retainer in the housing to fixedly engage threads on the port to lock the port to the housing in a snap fit connection; and forming the retainer with an end portion defining an aperture and at least one resilient outer leg projecting from the end portion and terminating in a tip at an end of an inner leg extending angularly inward from an apposite end of the outer leg, the tip end of the inner leg engageable with the threads on the first fluid component.

7. A fluid quick connector comprising:

a first fluid carrying component having external threads on a port;

a housing having a through bore extending between first and second ends, the first end adapted for connection to a second fluid component;

the second end of the housing having a bore portion adapted to be mounted over threads of the first fluid component; and a retainer carried in the housing and having a movable leg engagable with the threads on the first fluid component as the housing is engaged with the first fluid component to connect the housing to the first fluid component, the retainer including a one piece body having an end portion defining an aperture and at least one resilient outer leg projecting from the end portion and terminating in a tip at an end of an inner leg extending angularly inward from an opposite end of the outer leg, the tip end of the inner leg engageable with the threads on the first fluid component.

* * * * *